(12) United States Patent
Little et al.

(10) Patent No.: US 6,329,967 B1
(45) Date of Patent: *Dec. 11, 2001

(54) BISTABLE PAPER WHITE DIRECT VIEW DISPLAY

(75) Inventors: Michael J. Little, Woodland Hills; William P. Robinson, Thousand Oaks; Eric A. Gifford, Newbury Park, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,886

(22) Filed: Dec. 20, 1999

Related U.S. Application Data

(63) Continuation of application No. 09/179,750, filed on Oct. 28, 1998.

(51) Int. Cl.[7] .................................. G09G 3/20; G09G 3/34
(52) U.S. Cl. .......................... 345/55; 345/108; 345/109; 345/102; 359/227; 359/233; 359/234
(58) Field of Search .............................. 345/55, 108, 109, 345/102; 359/227, 233, 234, 243, 290, 291

(56) References Cited

U.S. PATENT DOCUMENTS

| | | | |
|---|---|---|---|
| 4,383,255 | * | 5/1983 | Grandjean et al. .................. 340/764 |
| 4,564,836 | * | 1/1986 | Vuilleumier et al. ................ 340/783 |
| 5,111,193 | * | 5/1992 | Huber et al. .......................... 340/783 |
| 5,504,614 | * | 4/1996 | Webb et al. .......................... 359/223 |
| 6,005,649 | * | 12/1999 | Krusius et al. ........................ 349/73 |

FOREIGN PATENT DOCUMENTS

WO 99/45423    10/1999    (WO) ............................. G02B/26/02

\* cited by examiner

*Primary Examiner*—Bipin Shalwala
*Assistant Examiner*—Jimmy H Nguyen
(74) *Attorney, Agent, or Firm*—Blakely, Sokoloff, Taylor & Zafman LLP

(57) ABSTRACT

A thin low power, paper white, direct-view display includes an array of bistable micromirrors that are deflected between two stable states, a dark state in which the mirror covers a portion of the background and a white state in which the mirror uncovers the background. The drive electronics are similar to those used in multiplexed LDCs but are modified in order to drive the micromirrors to one of their two stable states. The micromirrors in the enabled row are attracted up or down with sufficient force to exceed the micromirrors' bistable threshold and deflect the micromirrors to their dark and white states, respectively. The attractive forces on the micromirrors in the remaining non-enabled rows are insufficient to exceed the micromirrors' bistable threshold so that the micromirrors remain in their current stable state.

42 Claims, 6 Drawing Sheets

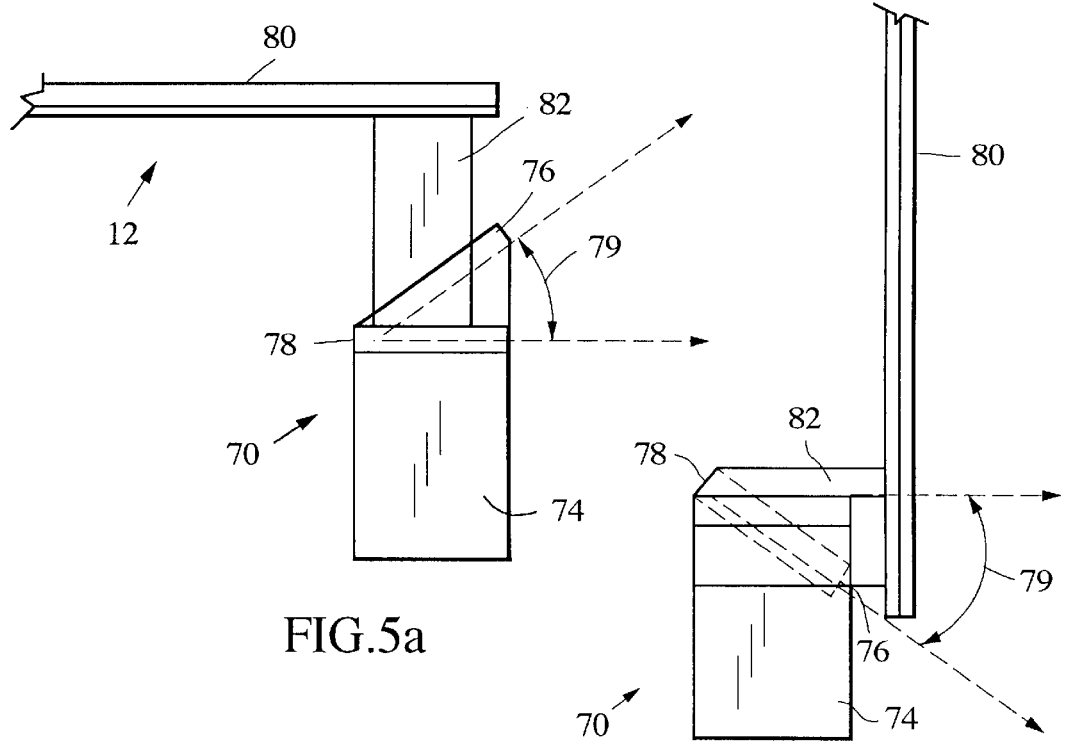
FIG.5a
FIG.5b
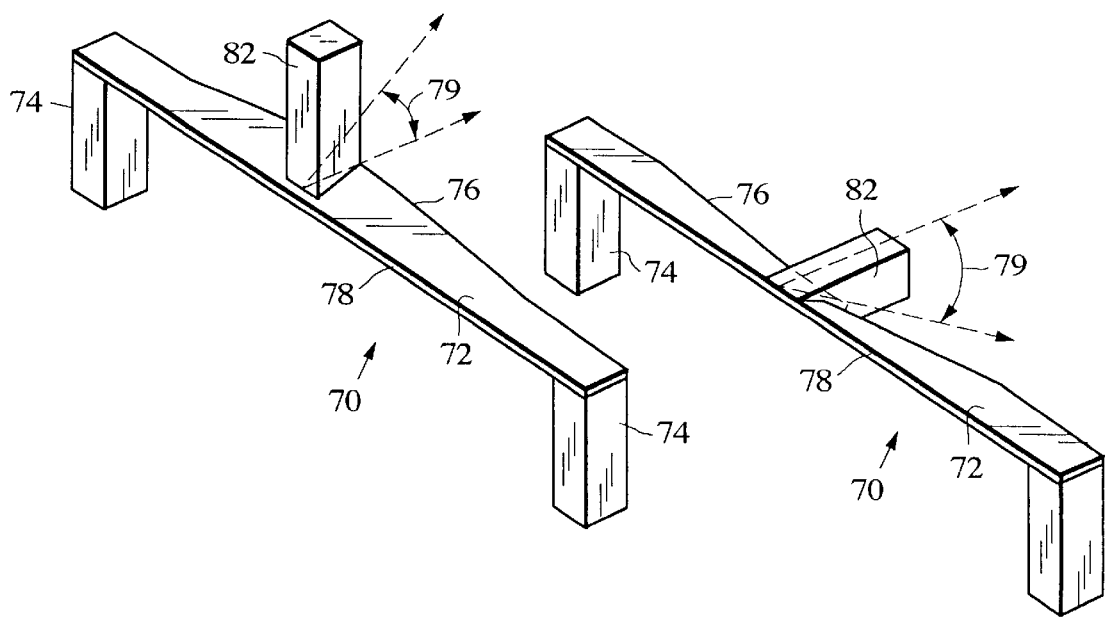
FIG.6a
FIG.6b

BISTABLE PAPER WHITE DIRECT VIEW DISPLAY

This application is a Continuation of application Ser. No. 09/179,750 filed Oct. 28, 1998.

BACKGROUND OF THE INVENTION

1. Field of the Invention

This invention relates to direct view displays and more specifically to a paper white display that combines passive addressing technology with a bistable micromirror faceplate.

2. Description of the Related Art

Direct-view displays produce images that can be viewed directly without the aid of magnification or projection. The market for direct view displays spans a continuum of performance and price that includes the ultra high performance but very expensive flat-panel DTVs, moderately performing and priced laptop computers, and the lower performing but much cheaper personal digital assistants, electronic books and cellular telephones. The high-end displays offer high spatial and color resolution but are very expensive and consume a lot of power. The low-end displays offer less resolution but are relatively cheap and can be operated from battery power.

This low-end market is currently dominated by the multiplexed liquid crystal display (LCD) technology. Multiplexed LCDs sacrifice grey scale performance in favor of fabrication simplicity and power consumption by eliminating the thin film transistor (TFT) array used in Active Matrix LCDs (AMLCD), which dominate the laptop computer market. The liquid crystal panel is fabricated with orthogonal row and column addressing lines on opposite sides of the liquid crystals that are driven by row and column drive electronics. The row drivers enable the row addressing lines one row at a time while the column drivers apply selected voltages to all of the column addressing lines to apply a voltage across the cells in the enabled row. The voltage changes the transmissive characteristics of the liquid crystal, which in turn optically modulates the amount of light transmitted through the LCD.

Because liquid crystals respond relatively slowly to changes in the applied voltage, the cell modulation is proportional to the root-mean-square (rms) voltage applied across the cell throughout the frame time. Although the voltage applied during the row enable is very large, the background noise created by the applied voltages for the remaining n–1 rows greatly reduces the RMS value of the margin between the off-state and full on-state of the liquid crystal. For example, commercially available AMLCDs can resolve about 16 million different colors while similarly available multiplexed LCDs can resolve only 256 different colors. As the number of scanned rows increases, this disparity in grey scale color resolution grows.

These LCDs must be constantly refreshed, e.g. 30 times per second, which consumes a lot of power. Without a sustaining voltage they will decay from their modulated state to their relaxed state over time. Furthermore, the polarizers inherently required by LCDs absorb such a large fraction of the ambient light, typically 60%–70%, they are unable to produce the "paper white" quality desired by the industry. As such consumers must make do with cell phones and PDAs whose gray displays are difficult to read even under the best ambient lighting conditions. Power consuming backlights must be added to improve their readability to minimum acceptable levels.

Another class of displays that are prevalent and gaining market share in low-end applications are bistable displays. True bistable displays have two stable states, black and white, and require no power to remain in either state. Since bistable displays do not require continuous refreshing they are very low power. This makes them ideally suited for applications such as cellular telephones and PDAs. Adequate grey scale resolution can be achieved using standard half-toning techniques. However, known bistable displays suffer from the same problem as multiplexed LCDs, their white state tends to be gray rather than paper white. As a result, they require backlighting and their readability is limited even in the best ambient light conditions.

Kent Displays, Inc. is the leader in bistable Cholesteric LCDs. The bistability of cholesteric optical textures allows for high resolution on a low cost passive matrix with reduced power consumption since power is not needed to continuously refresh the image. The reflected colors of the cholesteric liquid crystal materials provide for a display that is readily viewed in sunlight or low ambient light without dedicated illumination. However, single layer cholesteric LCDs are colored and combining different color layers to get a neutral color dark state severely reduces the overall brightness of the display. These displays are very dim; black characters on a dark grey background instead of black on a white background.

Xerox PARC is developing a gyricon technology in which 100 micron bichromal spheres are cast in a clear elastomer on a flexible substrate. The sphere dipole causes rotation in an electric field to show either the black or white surface of the sphere. The gyricon display is thin, flexible, exhibits a wide viewing angle and, like other bistable devices, requires no power to store the device. However, contrast ratios of only 6:1 have been achieved.

E Ink, Corporation is developing an alternative bistable display technology, electronic ink, in which the ink is made of microcapsules, each of which can change color with an applied electric field. More specifically the microcapsules are filled with a colored dye. Charged white particles are suspended in the dye. Orienting the electric field the right way causes white particles to be attracted to the surface so that the display appears white and vice-versa. E Ink claims to have achieved 75% brightness, 30:1 contrast ratio and a 180 degree viewing angle.

Iridigm Display Corporation uses a MEMS technology in which bridge-like elements move up and down in response to an applied voltage to achieve a bistable display. By changing an element's position from up to down, either constructive or destructive interference is created with an external light source. This allows each element to switch from reflective to absorbing, from green to black, for example. Each image pixel is composed of tens-to-hundred of bridge elements, which facilitates grey scale and reduces yield requirements. Iridigm's displays are fabricated on glass substrates using standard thin film transistor (TFT) materials and processing techniques, that allow them to construct aluminum bridge elements and a proprietary thin-film stack to control interference. However, because Iridigm's display is based on interference patterns it will be sensitive to viewing angle and will have difficulties achieving paper white quality.

A number of electromechanical shutter bistable display technologies have been pursued and patented for direct view displays, but have not yet succeeded to large scale commercialization due to a variety of issues including fabrication, stiction, limited contrast ratio, poor optical efficiency, high cost and poor pixel uniformity. These displays are bistable in the sense that they are black and white and do not require continuous refresh. However, they do require power to store the image and thus are not bistable in the truest sense of the meaning.

U.S. Pat. No. 3,553,364 to Lee entitled "Electromechanical Light Valve" describes an electromechanical light valve in an array of many such valves for controlling the transmission of light in continuously changing patterns. Each light valve consists of a housing having grounded conducting walls for shielding the interior thereof from external electrostatic forces produced by surrounding valves and a leaf shutter mounted in the housing. The application of a voltage to the leaf shutters causes the shutter to be attracted to the grounded conducting walls. As the voltage differential increases, the angle the shutter deflects increases, which in turn allows less light to pass through the housing.

Lee's design always involves the leaf shutters touching one surface or another, e.g. the conductive center plate or the grounded conductive walls, which can and will cause stiction due to the Van der Waals forces. The optical efficiency of this design is very low due to the low open aperture caused by the opaque conductive sidewalls. The portion of each pixel that is transparent and thus able to transmit light is a small fraction of the pixel. In addition, the cost and complexity of fabricating an array of such housings makes high resolution displays impractical.

U.S. Pat. No. 4,564,836 to Vuilleumier et al. entitled "Miniature Shutter Type Display Device with Multiplexing Capability" describes a display device comprising an insulating carrier and shutters that are capable of rotating under the effect of an electric field. The shutters are grouped in pairs and are controlled by applying a voltage between the shutter and a counter-electrode. After actuating the selected shutter, a holding voltage is then applied between the pair of shutters to hold them in place. Vuilleumier's device involves shutters touching each other or a stop, which can cause stiction problems. This design, like that of Lee, also has low optical efficiency due to the opaque sidewalls of the individual cavities.

U.S. Pat. No. 5,784,189 to Bozler et al. entitled "Spatial Light Modulator" discloses a spatial light modulator formed of a moveable electrode which is disposed opposite a fixed electrode, and is biased to roll in a preferred direction upon application of an electric field across the electrodes to produce a light valve or light shutter. As shown in FIGS. 24–25, Bozler teaches a quasi "bistable" device, one in which the "hold-on" voltage is less than the voltage required to initially turn the shutter on. Bozler's devices do not exhibit true bistability in the sense that if the field is removed entirely the device does not remain in one of two stable positions. Energy is required to resist the spring force. This consumes power equal to the product of the hold-on voltage and the parasitic resistance.

Bozler's quasi "bistability" is created by forming a step S in the moveable electrode, which produces a hysteresis in the voltage required to unroll the coil. A second way to create a quasi bistable device is to use the Van der Walls forces, which occur when two materials come into contact. By selecting materials and controlling the surface condition a magnitude of adhesion force can be achieved which is low enough to allow roll-up of the shutter at zero applied voltage but large enough to significantly reduce the hold voltage below the roll out voltage, assuming there is no step. An alternate bistable device is illustrated in FIG. 27, in which a deformable membrane switch switches between an up position where it looks white or the color of the conductor and a flat position where it looks black or blue. The deformable switch is biased in the up position by anisotropic stress. Once pulled down by the application of an electric field, the switch will stay down due to the Van der Waals forces as long as the applied electric field exceeds a threshold. In all cases, Bozler's designs cannot achieve true bistability since none of his designs teach a method of actively driving the shutter into both the "ON" state and the "OFF" state.

SUMMARY OF THE INVENTION

In view of the above problems, the present invention provides a thin, low power, paper white direct-view display.

The display includes (1) an array of electrostatically actuated bistable micromirror structures that are mounted in front of a contrasting background, are electrically connected by a plurality of column addressing lines, and deflect between two stable states; (2) a first plurality of row addressing lines that are positioned above the micromirror; and (3) a second plurality of row addressing lines that are positioned below the micromirror structures.

The two stable states of each micromirror structure are preferably an open state, in which the micromirror structure covers a portion of the contrasting background, and a closed state, in which the micromirror structure uncovers the portion of the contrasting background. In operation, the micromirror structures respond to potential differences between the micromirror structures and the row addressing lines that produce attractive forces that actuate the micromirror structures a row-at-a-time between the two stable states. The row addressing lines may be configured to connect arrays of attractor pads that are positioned above and below the micromirrors. The attractor pads provide a larger area than the addressing lines, which increases the attractive force for a given voltage.

Because the micromirrors are bistable and respond very quickly, a passive addressing scheme, i.e. no transistor array, can be used to deflect the micromirrors between their two states. Row drive electronics enable one pair of row addressing lines at a time while column drive electronics simultaneously drive all the column addressing lines so that the micromirrors in the enabled row are attracted either up or down with sufficient force to exceed the micromirrors'bistable threshold and deflect each micromirror to its intended stable state. The attractive forces on the micromirrors in the remaining non-enabled rows are insufficient to exceed the micromirrors'bistable threshold so that the micromirrors remain in their current stable state. The bistable micromirrors do not require continuous refreshing or even a quiescent power to hold them in their desired state and thus operate at very low power levels.

In a preferred embodiment of the invention, the micromirrors are formed on a translucent white substrate and positioned in front of a backlight. Under most ambient lighting situations, the display achieves near paper white quality. When ambient light is absent, the backlight provides sufficient illumination to achieve near paper white quality. Each mirror petal has a highly reflective surface and a highly absorbent surfaces. This configuration produces a dark state in which the mirror's outwardly facing absorbent surface covers a portion of the white background to both block transmitted light and absorb ambient light and a white state in which the mirror uncovers the background to reflect ambient light onto the white substrate and let transmitted light pass. Alternately, the display can be implemented without a backlight, in which case the background could be black (opaque white) and the mirrors could reflect (absorb) ambient light when covering the background. In either case, adequate grey scale resolution can be achieved using conventional half-toning techniques. A color display can be implemented with a red, green and blue striped substrate.

True bistable response of the micromirror structures can be achieved in different ways. In a first preferred embodiment of the present invention, bistability is provided using the mechanics of the micromirror hinge, by making one edge of the hinge longer than the other. This produces a compressive force when the hinge is flat that tends to drive the hinge to one of the two stable states. The hinge will remain in its stable state unless a sufficient force is applied to overcome the compressive force.

In a second preferred embodiment of the present invention, the bistable response is provided using Van der Waals forces. This is achieved by actuating the micromirror between a pair of stops. The material used for the stops and the stop surface can be tailored to achieve an adhesion force with a magnitude that is low enough to allow the micromirror to be driven to the opposite state when its row is enabled, but large enough to exceed any force that may be acting on the micromirror when its row is not enabled.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a and 5b are sectional views of a micromirror that uses a bistable hinge;

FIGS. 6a and 6b are perspective views of the bistable hinge shown in FIG. 5 in its two stable states.

DETAILED DESCRIPTION OF THE INVENTION

The present invention provides a paper-white bistable direct-view display in which a passive addressing scheme deflects an array of electrostatically-actuated micromirrors between two stable states, an open state in which the mirror covers a portion of a contrasting background and a closed state in which the mirror uncovers the background, to produce a visible image. The portion covered by the mirror corresponds to an image pixel or some fraction of an image pixel. Grey scale is achieved using standard half-toning techniques in which each image pixel corresponds to multiple mirrors. The flat-panel display exhibits paper white quality at a fraction of the power required by multiplexed LCDs.

The bistable micromirror display provides a particularly good fit with certain user-interactive applications such as personal digital assistants, cellular telephones and electronic books that require a good white state and low power consumption but only limited grey scale resolution. The micromirror display provides the brightness required to achieve the elusive "paper white" quality that the display industry has been seeking and that consumers have been demanding. Furthermore, the micromirror display does not require continuous refreshing or even a quiescent power to hold the current image, and thus only consumes power when the image content changes. Because the content of these types of displays changes relatively infrequently, the amount of power needed to drive the display may be an order of magnitude or less of that required to drive an LCD. In addition, because the display is paper white in ambient light, the backlight is required much less frequently, only as a night light. Since the display and backlight may consume a substantial portion of the total power used by these devices, this dramatic improvement will extend battery life and may eliminate the need for a rechargeable battery altogether and allow such devices to run off photo electric cells.

Figure 1:
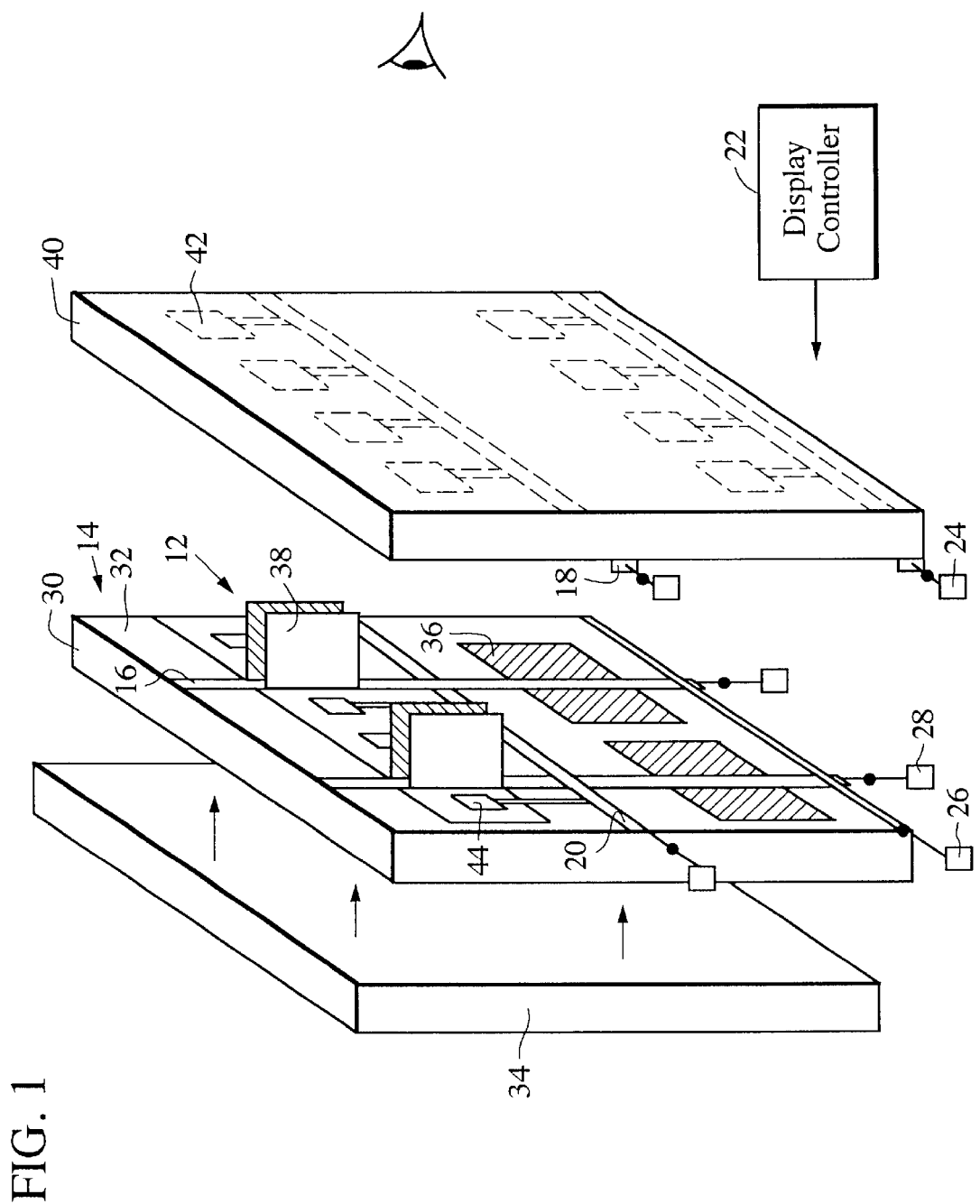
FIG. 1 is a perspective view of a bistable direct-view display in accordance with the present invention.

As shown in FIG. 1, a direct-view display 10 includes an array of electrostatically-actuated bistable micromirrors 12 that are placed in front of a white background 14. Each micromirror 12 switches between two stable states, a dark state in which the mirror covers a portion of background 14 and absorbs incident light and a closed state in which the mirror uncovers the background and reflects ambient light onto the background. To maximize contrast ratio, the mirror preferably deflects a full 90 degrees to uncover the entire portion covered by the mirror. However, near paper white quality can be achieved with something less than full 90 degree deflection. Limited grey scale can be achieved using conventional half-toning techniques.

Micromirrors 12 are bistable, and thus require no power to remain in either state. Since bistable displays do not require continuous refreshing or even a quiescent power to hold them in their current state they require very low power. Bistability may be achieved in many different ways. A micromirror hinge having one edge longer than the other produces a compressive force when the hinge is flat that tends to drive the hinge to one of two stable states. Another approach is to deflect a freely rotating micromirror between a pair of stops and use the Van der Waals forces to produce the bistability. These approaches may be used in combination to improve reliability.

The drive electronics are similar to those used in multiplexed LCDs but are modified in order to drive the micromirrors between their two stable states. The micromirror array is connected into a number of columns by column addressing lines 16. Two sets of row addressing lines, 18 and 20, are respectively positioned above and below the micromirror array.

A display controller 22 causes the row drive electronics, 24 and 26, to enable one pair of row addressing lines, 18 and 20, at a time. The column drive electronics 28 simultaneously drive column addressing lines 16 so that the micromirrors in the enabled row are attracted either up or down with sufficient force to exceed the micromirrors' bistable threshold and deflect the micromirrors to their dark and white states, respectively. Because the micromirrors exhibit very fast response times they can be driven to the desired stable state within the row-addressing period. The attractive forces on the micromirrors in the remaining non-enabled rows are insufficient to exceed the micromirrors' bistable threshold so that the micromirrors remain in their current stable state. The display can be updated with or without an erase state.

In the specific embodiment illustrated in FIG. 1, the array of micromirrors 12 are supported on a glass substrate 30. In this particular configuration, the substrate has a translucent white surface 32 that both reflects ambient light and transmits light from a backlight 34 to provide the white background 14. The micromirrors have a highly absorbent interior surface 36 such that in their dark state the micromirrors block any transmitted light and absorb any ambient light. In their white state, the micromirrors allow transmitted light to pass through and ambient light to be reflected off of the background. The mirrors' exterior surfaces 38 are preferably highly reflective to maximize the amount of light reflected in the white state. Unlike LCDs and other bistable displays, the backlight is not required under normal ambient lighting conditions. Given the display's paper white quality, the backlight is only needed as a night light.

If the display is designed for ambient light viewing only, i.e. no back light, the background could be black (opaque white) and the mirrors could reflect (absorb) ambient light when covering the background. Color displays can be realized by coloring the background red, green and blue and using black mirrors or by applying varying thickness dielectric films such as SiO2 or Si3N4 to the mirrors to allow them to reflect specific colors, i.e. the oil film on water effect.

Row addressing lines 18 and 20 are respectively formed on the backside of display faceplate 40 and on the surface of substrate 30. The row addressing lines can be configured to both route the addressing voltages and provide the reference for attracting the micromirrors. As shown, row addressing lines 18 and 20 are configured to connect attractor pad array 42 that lies above the micromirrors on faceplate 40 and attractor pad array 44 that lies below the micromirrors on substrate 30 into rows that correspond to rows of micromirrors. The attractor pads have a larger cross-sectional area than the addressing lines, which increases the attractive force for a given voltage. Lower voltage drive electronics are easier to fabricate and are cheaper. Column addressing lines 16 are also formed on the surface of substrate 30. Air bridges or crossovers are used to electrically isolate the row and column addressing lines. Alternately, either the row or column addressing lines could be formed in a buried layer beneath the micromirror array.

Although there are potentially many different schemes that can be used to control the row and column drivers to actuate the micromirrors, there are some common relationships that should be satisfied and some design characteristics that are preferred. First, during a row enable the row and column drivers must apply voltages such that the net attractive force on micromirror 12, either up or down, is greater than the mirror's bistable threshold so that the mirror will be driven to the selected stable state. Second, the voltages on the remaining n-1 rows must produce a net attractive force on micromirror 12, either up or down, that is less than the mirror's bistable threshold so that the mirror will remain in its current stable state. Third, the addressing scheme should be designed to simplify the hardware and conserve charge. Fourth, the addressing scheme is preferably designed to avoid the necessity of an erase state. The inclusion of an erase state will accomplish the same purpose but complicates the design and operation of the display. Lastly, once all of the pixels in the display have been set to their desired state power to the mirrors can be removed. This will eliminate any quiescent power loss.

Figure 2:
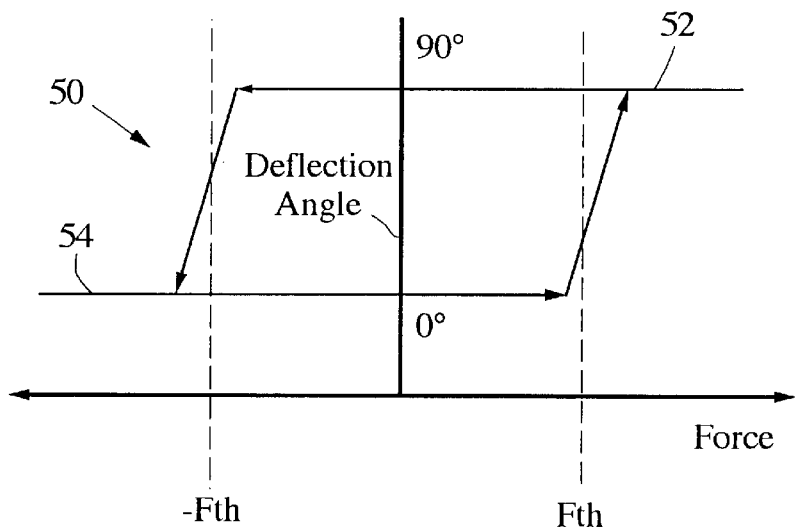
FIG. 2 is a plot of the bistable response exhibited by the micromirror.
Figure 4:
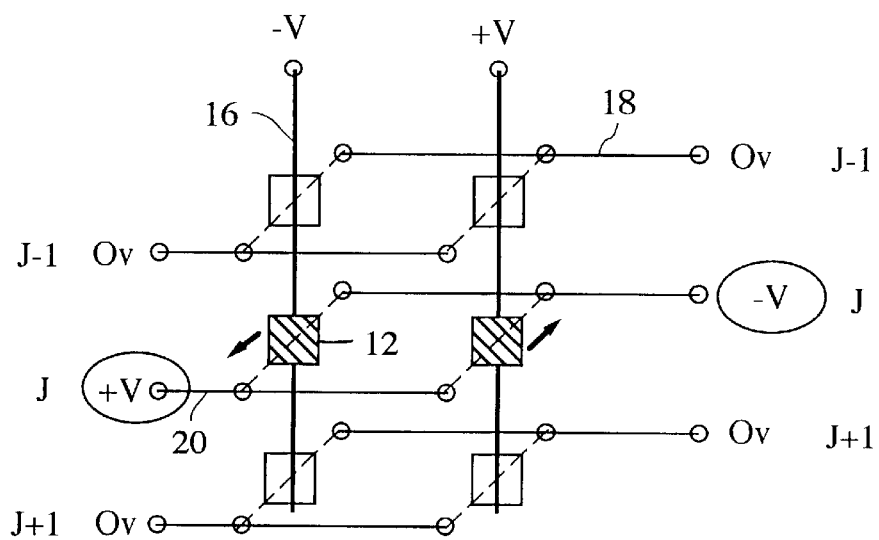
FIG. 4 is a schematic illustration of the passive addressing scheme.

The bistable response 50 exhibited by the micromirror is depicted in FIG. 2 in terms of the net force exerted on the mirror. When the net attractive force on the mirror is toward the row addressing line and/or attractor pad above the mirror and exceeds a threshold (Fth), the mirror deflects to its up position 52. The mirror remains in its up position until the net attractive force is toward the row addressing line and/or attractor pad below the mirror and exceeds -Fth. This causes the mirror to deflect to its down position 54 where it again remains until the net force in the opposite direction exceeds the threshold. It is clear that the micromirror is truly bistable. Once switched to a stable state, the mirror will remain in the stable state if power is removed.

The bistable response assumes that the actuating force is applied for a long enough period of time that the mirror switches to the stable state. If the actuating force were to be removed while the mirror was in an unstable state, the mirror may deflect to the desired stable state or return to the previous stable state. This is precisely why the fast response time of the micromirrors is so important. The row addressing time can be relatively short, on the order of hundreds of microseconds, and still assure stable switching. Because the row addressing time is short, the number of rows that can be addressed is high, much higher than multiplexed LCDs.

FIGS. 3a–3d and 4 illustrate a complete write sequence that utilizes simple drivers to switch the voltages on the row and column addressing lines and does not entail an erase sequence. In this particular example, row addressing lines 18 are switched between 0V and −V, row addressing lines 20 are switched between 0V and +V, and column addressing lines 16 are switched between −V and +V. Clearly different voltage combinations will work as long as they produce net attractive forces that satisfy the mirror's bistable response. Once the display has been updated, the power can be turned off, i.e. all voltages switched to zero, until the display changes again.

Also in this particular example, the attractor pads 42 above the micromirrors are shown in two different configurations, a pair of pads 42a that are centered above each mirror in its open state and a single pad 42b that is centered between the two mirrors in their closed state. The single pad configuration should reduce crosstalk between adjacent mirror pairs. In general, the attractor pads should be configured such that the normal component of the force produced by the electric field between the attractor pad and mirror is maximized in order to reduce the voltage swing required to actuate the mirrors. This is a practical consideration that goes to the ability to fabricate the display on low voltage fabrication lines and reduce cost.

Figure 3A:
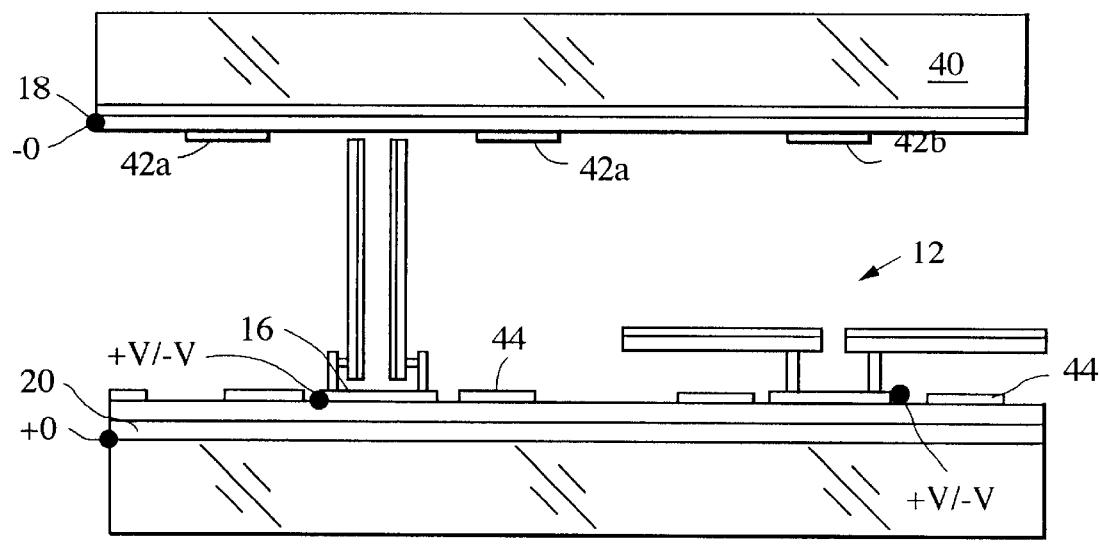
FIGS. 3a through 3d are sectional views of the display during an addressing sequence.

As shown in FIG. 3a, the row of two micromirrors 12 are not enabled. The voltage on the attractor pads above and below the micromirrors is 0V so that the net force on the micromirrors, whether they are driven with −V or +V, is less than the threshold force. In either case, the mirror will be attracted to both pads such that the attractive forces will tend to cancel each other. Due to the device geometry the cancellation will not be exact but sufficient to reduce the net force in either direction below the threshold.

Figure 3B:
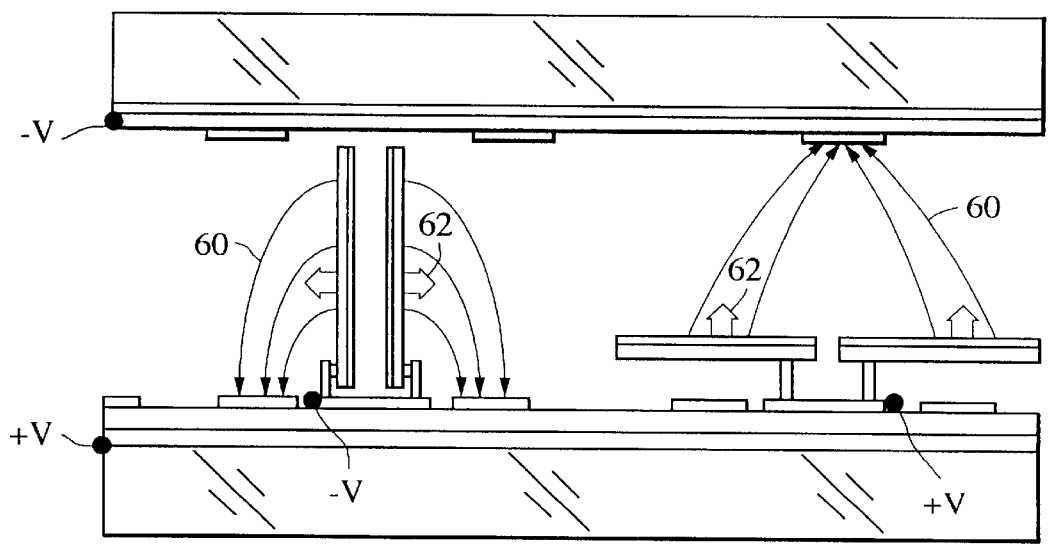

As shown in FIG. 3b, the write sequence is initiated for the jth row by switching the voltage applied to row addressing lines 18 and 20 to −V and +V, respectively, and switching the voltage on the column addressing lines 16 to the desired state, either −V or +V while the row addressing lines for the j−1 and j+1 rows go to 0V. As described in FIG. 3a, the mirrors in rows j−1 and j+1 will remain in their stable states. In the jth row, the application of −V to the micromirror creates zero potential difference between the mirror and attractor pad 42a above the mirror and creates a 2V potential difference between the mirror and attractor pad 44 below the mirror so that the only force acting on the mirror is an attractive force toward pad 44. The value 2V is selected such that the force exceeds the threshold force needed to switch states. To this end, attractor pads 42 and 44 are preferably configured so that the electric field 60 between the pad and the mirror produces a force component 62 that is normal to the mirror that causes the mirror to pivot and deflect to the desired stable state. Similarly, the application of +V to the other mirror produces an attractive force toward pad 42b that exceeds the threshold force needed to switch states.

Figure 3C:
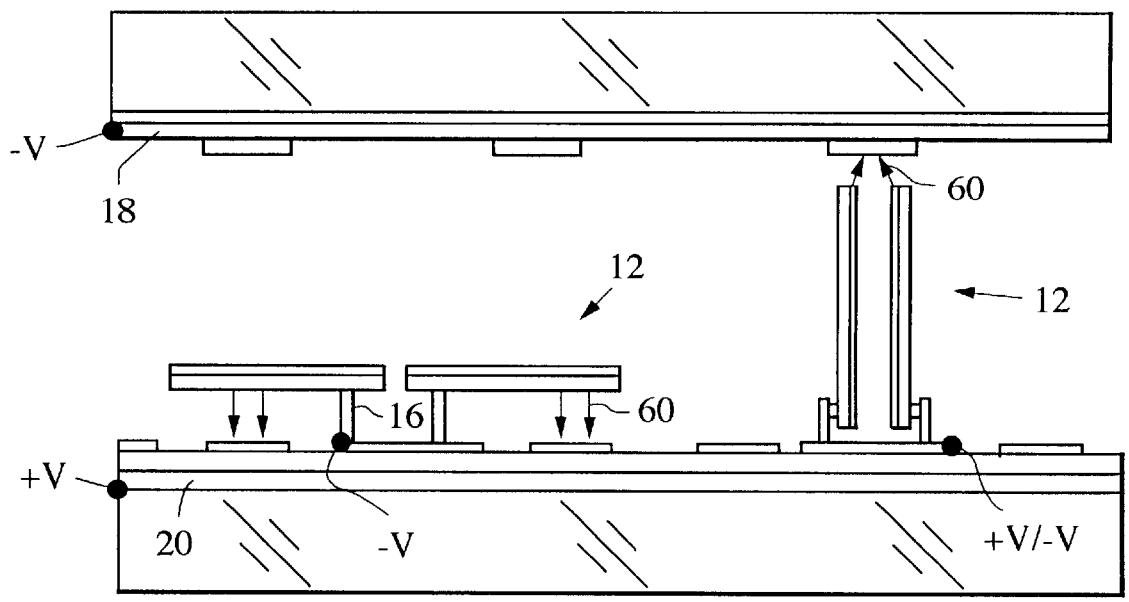
Figure 3D:
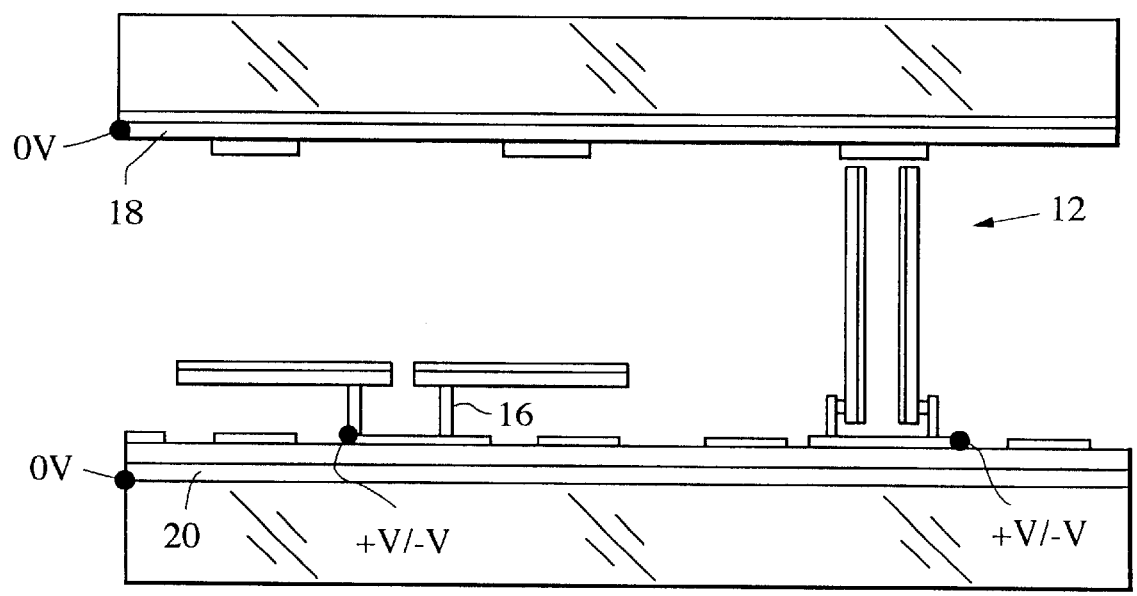

As shown in FIG. 3c, micromirrors 12 have switched states while the row is still enabled, i.e. the mirror response time is less than the row-addressing period. As discussed previously, if this were not true the mirrors could be in an unstable state when the row was disabled and either return to their previous stable state or switch to the desired stable state. As shown in FIG. 3d, the row addressing lines have been disabled. Regardless of what voltages (+V/−V) are applied to the column addressing lines for the next n-1 rows the net forces on the micromirrors are constrained to lie below the threshold and the mirrors will remain in their current stable state.

Figure 7A:
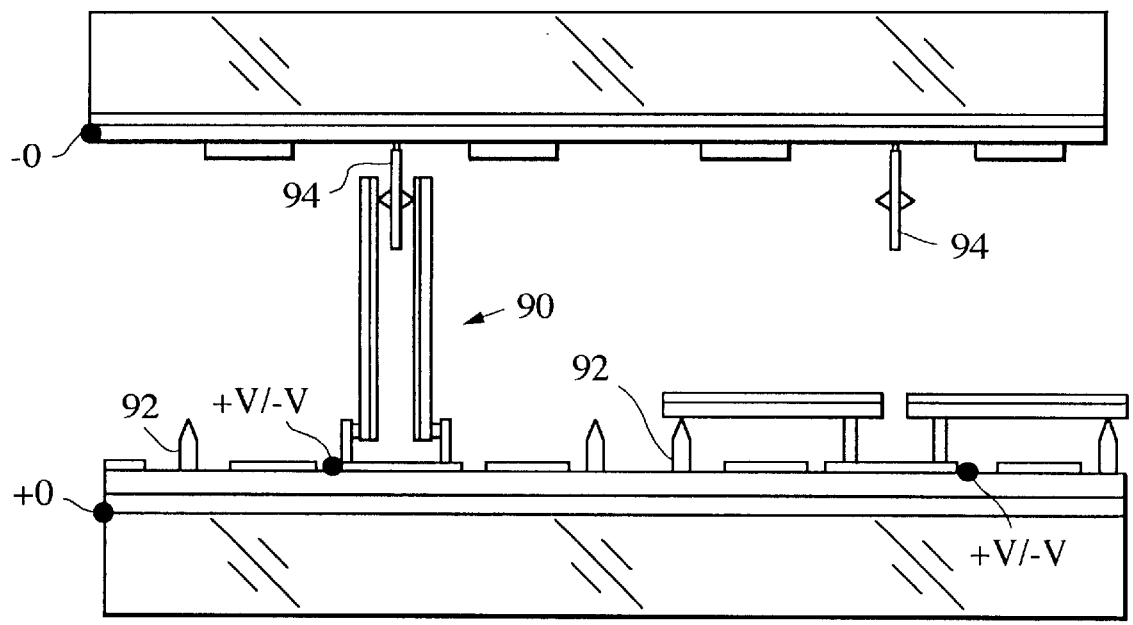
FIGS. 7a and 7b are sectional views of an alternate display in which Van der Waals forces are used to provide the desired bistable response.
Figure 7B:
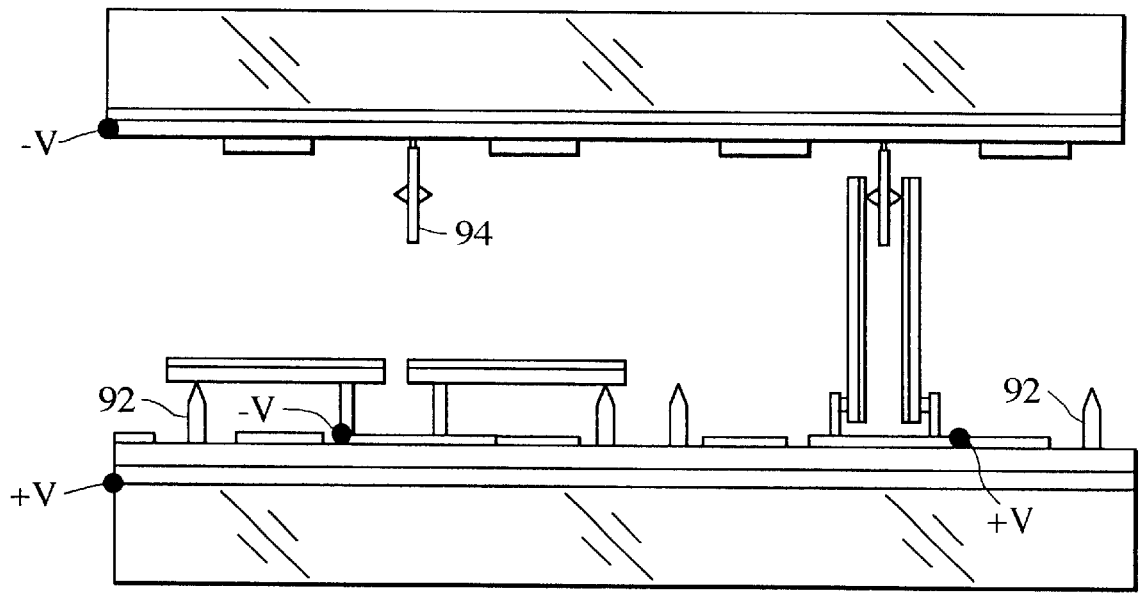

The micromirrors are truly bistable, and thus require no power to remain in either state. Since bistable displays do not require continuous refreshing or even a quiescent power to hold them in their current state they are very low power. Bistability may be achieved by making one edge of the micromirror hinge longer than the other as shown in FIGS. 5a–b and 6a–b. This produces a compressive force when the hinge is flat that tends to drive the hinge to one of two stable states. Another approach is to deflect a micromirror between a pair of stops and use the Van der Waals forces to produce the bistability as shown in FIGS. 7a–b. These approaches may be used in combination to improve reliability.

As shown in FIGS. 5a–5b and 6a–6b, one approach to achieving a true bistable response is to mount micromirror 12 on a hinge 70 that has only two stable states approximately 90° apart. One such hinge 70 comprises a relatively long narrow compliant strip 72 that is pinned at both ends by posts 74, which are mounted on the substrate (not shown). As shown the strip's outside edge 76, i.e. the edge opposite micromirror 12, is longer than the inside edge 78. This can be accomplished in a number of ways including fabricating the strip over a polyamide bump so that the outside edge is naturally longer. Alternately, an even narrower strip of material under compressive stress can be defined along the outside edge of the otherwise flat strip. The strip's compressive stress causes the outside edge to stretch to the desired length. Similarly, the compliant strip can be formed with compressive stress and an even narrow strip of material under tensile stress can be defined along the inner edge to shorten it.

As a result, strip 72 has a maximum compressive stress when it is flat and naturally "pops" or "snaps" to a stable cupped position either above or below the flat position. The amount of cupping, i.e. the deflection angle 79 formed between the flat and cupped positions at the midpoint of strip 72, is proportional to the difference in length between in the inside and outside edges. This difference is set so that the deflection angle 79 at the midpoint of strip 72 in either direction is approximately 45°.

Micromirror 12, which is covered with an anti-reflective coating 80, is mounted on a post 82 at the midpoint of strip 72. The bottom of post 82 is tapered by a complementary 45° such that the mirror lies approximately flat in one position and approximately upright in the other. Alternately, the lengths of the inside and outside edges and the direction of post 82 can be reversed with the same result.

As shown in FIGS. 7a–7b, another approach to achieving a bistable response is to actuate a mirror 90 between a pair of stops 92 and 94 and use the Van der Walls forces, which occur when two materials come into contact, to create the bistability. By selecting materials and controlling the surface condition a magnitude of adhesion force can be achieved which is low enough to allow the mirror to be driven to the opposite state when its row is enabled but large enough to exceed any force that might be applied to the mirror when its row is not enabled. As shown, stops 92 and 94 form a tip at the point of contact with mirror 90. The radius and/or area of the tip determines the magnitude of the adhesion force so that the mirror can be driven to the opposite state without having to use high voltage drive electronics.

This configuration can be implemented in combination with the bistable hinge structure discussed above to increase reliability should either fail. In this case, the display would be configured so that either force is sufficient to hold the mirror in its current state when the row is not enabled. When the row is enabled, the actuating force would exceed the sum of the two forces. Alternately, a very weak or even a freely rotating hinge structure can be used in conjunction with the Van der Waals forces. The latter type of structure can be built using standard MEMS processing techniques such that the mirror is formed with a pair of pins that are positioned inside a pair of yokes.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A direct view display, comprising:
   a background; and
   an array of micromirrors that are adapted to be electrostatically actuated to switch between two states, an open state in which the micromirror covers a portion of the background corresponding to a pixel of the display and a closed state in which the micromirror substantially uncovers the portion of the background, wherein said background has a surface that reflects ambient light, and each micromirror has an interior surface that absorbs light and an exterior surface that reflects light, said micromirrors being configured in pairs that switch together so that, in said open state, their interior surfaces absorb ambient light and, in said closed state, their interior surfaces face each other to reduce the absorption of ambient light and their exterior surfaces are exposed to reflect ambient light to and from the background.

2. The display of claim 1, further comprising a controller that applies a potential to produce electrostatic forces for actuating the micromirrors between their two states.

3. The display of claim 2, wherein the controller applies a first potential to enable selected micromirrors for a period longer than a response time of the micromirrors, and then applies a second potential to actuate the enabled micromirrors between their open and closed states, the remaining non-enabled micromirrors remaining in their current state.

4. The display of claim 1, further comprising a stability mechanism that causes said micromirrors to remain in either of the first and second states unless and until an actuating force is applied to the micromirrors that is sufficient to overcome an actuation threshold.

5. The display of claim 4, wherein the stability mechanism comprises an array of hinges mechanically coupled to the array of micromirrors, each of the hinges having a bistable response that actuates a corresponding micromirror between the open state and the closed state and holds the micromirror in either state when power is removed from the array of micromirrors.

6. The display of claim 4, wherein the stability mechanism comprises first and second stops associated with each of the micromirrors, the first and second stops positioned so that their respective micromirror contacts the first and second stops when the respective micromirror is in the open and closed states, respectively, wherein the micromirrors and their respective first and second stops are adapted so that Van der Walls forces are created when the micromirrors contact their respective first or second stops that hold the micromirrors in either state when power is removed from the array of micromirrors.

7. The display of claim 1, further comprising a backlight, said background surface transmitting light from the backlight and reflecting ambient light.

8. The direct-view display of claim 1, wherein in the closed state the micromirror substantially uncovers the portion of the background without covering another portion of the background.

9. A direct-view display, comprising:
a background;
an array of micromirrors that are adapted to be electrostatically actuated to switch between a first stable state, in which the micromirror covers a portion of a background corresponding to a pixel of the display, and a second stable state, in which the micromirror substantially uncovers the portion of the background, in response to an actuating force; and
a stability mechanism that causes said micromirrors to remain in either stable state unless and until the actuating force applied to the micromirrors is sufficient to overcome an actuation threshold, wherein said background has a surface that reflects ambient light, and each micromirror has an interior surface that absorbs light and an exterior surface that reflects light, said micromirrors being configured in pairs that switch together so that, in said open state, their interior surfaces absorb ambient light and, in said closed state, their interior surfaces face each other to reduce the absorption of ambient light and their exterior surfaces are exposed to reflect ambient light to and from the background.

10. The display of claim 9, wherein the stability mechanism comprises a bistability mechanism for maintaining said micromirrors in either stable state when power is removed from the micromirror array.

11. The display system of claim 10, further comprising a controller that applies a potential to produce electrostatic forces for actuating the micromirrors between the two stable states.

12. The display of claim 11, wherein the controller applies a first potential to enable selected micromirrors for a period longer than a response time of the micromirrors, and then applies a second potential to actuate the selected micromirrors.

13. The display of claim 10, wherein the bistable mechanism comprises an array of bistable hinges mechanically coupled to the array of micromirrors.

14. The display of claim 10, wherein the bistable mechanism comprises first and second stops associated with each of the micromirrors and positioned to contact their respective micromirror when the micromirror is in the first or second stable state, said contact creating Van der Walls forces that create the actuation threshold.

15. The direct-view display of claim 9, wherein in the second stable state the micromirror substantially uncovers the portion of the background without covering another portion of the background.

16. A direct-view display, comprising:
a background;
an array of electrostatically-actuable micromirrors that deflect with a known response time between two stable states, an open state in which the mirror covers a portion of said background corresponding to a pixel of the display and a closed state in which the mirror substantially uncovers the portion of the background, in response to an actuating force to produce a direct-view image; and
a controller that applies a first potential to enable selected micromirrors for a period longer than the mirrors' known response time and applies a second potential to produce an actuating force on the enabled micromirrors that exceeds an actuation threshold and actuate the enabled mirrors between their two stable states, the actuating forces on the remaining non-enabled micromirrors being insufficient to overcome the actuation threshold so that the non-enabled mirrors remain in their current stable state, wherein the said background has a surface that reflects ambient light, and each micromirror has an interior surface that absorbs light and an exterior surface that reflects light, said micromirrors being configured in pairs that switch together so that, in said open state, their interior surfaces absorb ambient light and, in said closed state, their interior surfaces face each other to reduce the absorption of ambient light and their exterior surfaces are exposed to reflect ambient light to and from the background.

17. The direct-view display of claim 16, further comprising an array of hinges that actuate said respective micromirrors between their open and closed states, said hinges having a bistable response that actuates the micromirrors between their two stable states.

18. The direct-view display of claim 16, further comprising first and second stops that contact said micromirror in its open and closed states, respectively, wherein Van der Walls forces that occur when the micromirrors contact said stops create a bistable response.

19. The display of claim 16, wherein the controller receives updated image information, updates the direct-view image in accordance with the updated image information by applying the first and second potentials, and once the direct-view image is updated, removes power from micromirror array.

20. The direct-view display of claim 16, wherein in the closed state the micromirror substantially uncovers the portion of the background without covering another portion of the background.

21. A bistable direct-view display, comprising:
a background;
an array of micromirrors that are adapted to be electrostatically actuated to switch between two stable states, an open state in which the micromirror covers a portion of the background corresponding to a pixel of the display and a closed state in which the micromirror substantially uncovers the portion of the background; and
a bistable mechanism that causes said micromirrors to remain in either stable state unless and until an actuating force is applied to the micromirrors that is sufficient to overcome an actuation threshold, wherein said background has a surface that reflects ambient light, and each micromirror has an interior surface that absorbs light and an exterior surface that reflects light, said micromirrors being configured in pairs that switch together so that, in said open state, their interior surfaces absorb ambient light and, in said closed state, their interior surfaces face each other to reduce the absorption of ambient light and their exterior surfaces are exposed to reflect ambient light to and from the background.

22. The display of claim 21, further comprising a controller that applies a first potential to enable selected micromirrors, and then applies a second potential to the micromirrors to produce actuating forces on the enabled micromirrors that are sufficient to overcome the actuation threshold and switch the enabled micromirrors between their open and closed states, but which on the remaining non-enabled micromirrors are insufficient to overcome the actuation threshold so that the non-enabled micromirrors remain in their current stable state.

23. The display of claim 22, further comprising an array of hinges mechanically coupled to the array of micromirrors, each of the hinges having a bistable response that defines the actuation threshold and actuates a corresponding micromirror.

24. The display of claim 22, further comprising first and second stops associated with each of the micromirrors, the first and second stops positioned so that their respective micromirror contacts the first and second stops when the respective micromirror is in the open and closed states, respectively, wherein the micromirrors and their respective first and second stops are adapted so that Van der Walls forces are created when the micromirrors contact their respective first or second stops that, the Van der Walls forces defining the actuation threshold.

25. The direct-view display of claim 21, wherein in the closed state the micromirror substantially uncovers the portion of the background without covering another portion of the background.

26. A bistable direct-view display, comprising:
a background;
an array of micro mirrors that are adapted to switch between two stable states, an open state in which the micromirror covers a portion of the background corresponding to a pixel of the display and a closed state in which the micromirror substantially uncovers the portion of the background;
a bistable mechanism that causes said micromirrors to remain in either stable state unless and until an actuating force is applied to the micromirrors that is sufficient to overcome an actuation threshold; and
a controller that applies a first potential to the micromirrors a row at a time to enable that row and applies a second potential to each column of micromirrors to produce an actuating force on the micromirrors in the enabled row that exceeds the actuation threshold and actuate the enabled mirrors between their two stable states, the actuating forces on the micromirrors in the remaining non-enabled rows being insufficient to overcome the actuation threshold so that the non-enabled mirrors remain in their current stable state, wherein said background has a surface that reflects ambient light, and each micromirror has an interior surface that absorbs light and an exterior surface that reflects light, said micromirrors being configured in pairs that switch together so that, in said open state, their interior surfaces absorb ambient light and, in said closed state, their interior surfaces face each other to reduce the absorption of ambient light and their exterior surfaces are exposed to reflect ambient light to and from the background.

27. The display of claim 26, wherein the bistable mechanism comprises an array of hinges mechanically coupled to the array of micromirrors, each of the hinges having a bistable response that defines the actuation threshold and actuates a corresponding micromirror.

28. The display of claim 26, wherein the bistable mechanism comprises first and second stops associated with each of the micromirrors, the first and second stops positioned so that their respective micromirror contacts the first and second stops when the respective micromirror is in the open and closed states, respectively, wherein the micromirrors and their respective first and second stops are adapted so that Van der Walls forces are created when the micromirrors contact their respective first or second stops that, the Van der Walls forces defining the actuation threshold.

29. The direct-view display of claim 26, wherein in the closed state the micromirror substantially uncovers the portion of the background without covering another portion of the background.

30. A direct-view display, comprising:
a background; and
an array of micromirrors that are adapted to be electrostatically actuated to switch between two states, an open state in which the micromirror covers a portion of the background and a closed state in which the micro mirror is substantially vertically oriented to uncover the portion of the background, wherein said background has a surface that reflects ambient light, and each micromirror has an interior surface that absorbs light and an exterior surface that reflects light, said micromirrors being configured in pairs that switch together so that, in said open state, their interior surfaces absorb ambient light and, in said closed state, their interior surfaces face each other to reduce the absorption of ambient light and their exterior surfaces are exposed to reflect ambient light to and from the background.

31. The display of claim 30, further comprising a controller that applies a potential to produce electrostatic forces for actuating the micromirrors between their two states.

32. The display of claim 30, further comprising a backlight, said background surface transmitting light from the backlight and reflecting ambient light.

33. A direct-view display, comprising:
a backlight;
a translucent substrate that is illuminated by the backlight, said substrate having a surface that both reflects ambient light and transmits incident light from the backlight;
an array of micromirrors, each micromirror having an absorbent interior surface and being adapted to switch between two states, an open state in which the micromirror covers a portion of the substrate corresponding to a pixel of a display to block incident light and absorb ambient light and a closed state in which the micromirror substantially uncovers the portion of the substrate to allow ambient light to reflect off of and incident light to pass through that portion of the substrate.

34. The direct view display of claim 33, wherein each micromirror in said closed state uncovers the portion of the substrate without covering another portion of the substrate.

35. The display of claim 33, wherein each micromirror in said closed state is oriented approximately vertically to substantially uncover the portion of the substrate.

36. The display of claim 33, wherein each micromirror has a reflective exterior surface that reflect ambient light to and from the substrate when in the closed state to increase the amount of light reflected.

37. The display of claim 33, wherein said micromirrors are configured in pairs that switch together so that, in said open state, their interior surfaces absorb ambient light and, in said closed state, their interior surfaces face each other to reduce the absorption of ambient light.

38. The display of claim 37, wherein each micromirror has a reflective exterior surface that reflect ambient light to and from the substrate when in the closed state to increase the amount of light reflected.

39. The display of claim 33, wherein the micromirrors are adapted to be electrostatically actuated.

40. The display of claim 39, further comprising a controller that applies a potential to produce electrostatic forces for actuating the micromirrors between the two states.

41. The display of claim 40, wherein the controller applies a first potential to enable selected micromirrors for a period longer than a response time of the micromirrors, and then applies a second potential to actuate the selected micromirrors.

42. The display of claim 33, wherein further comprising a stability mechanism that causes said micromirrors to remain in either of the open or closed states unless and until an actuating force is applied to the micromirrors that is sufficient to overcome an actuation threshold.

* * * * *